United States Patent [19]
Kress et al.

[11] Patent Number: 4,826,918
[45] Date of Patent: May 2, 1989

[54] POLYCARBONATE MOULDING COMPOSITION WITH IMPROVED FLOW AND PROCESSIBLITY

[75] Inventors: Hans-Jürgen Kress, Pittsburgh, Pa.; Dieter Wittmann, Krefeld, Fed. Rep. of Germany; Bernd Quiring; Horst Peters, both of Leverkusen, Fed. Rep. of Germany; Jochen Schoeps, Krefeld, Fed. Rep. of Germany

[73] Assignee: Bayer Aktiengesellschaft, Leverkusen, Fed. Rep. of Germany

[21] Appl. No.: 161,711

[22] Filed: Feb. 29, 1988

[30] Foreign Application Priority Data

Mar. 7, 1987 [DE] Fed. Rep. of Germany ....... 3707360

[51] Int. Cl.$^4$ .............................................. C08L 69/00
[52] U.S. Cl. ........................................ 525/67; 525/73; 525/74; 525/902
[58] Field of Search ................... 525/67, 73, 74, 146, 525/148, 902

[56] References Cited

U.S. PATENT DOCUMENTS 4,530,965 7/1985 Bourland .............................. 525/67
4,683,265 7/1987 Kress et al. ........................... 525/67

Primary Examiner—Theodore E. Pertilla
Attorney, Agent, or Firm—Connolly and Hutz

[57] ABSTRACT

Thermoplastic molding compositions containing
A. 10 to 98 parts by weight and preferably 10 to 95 parts by weight of one or more thermoplastic aromatic polycarbonates,
B. 2 to 60 parts by weight and preferably 5 to 60 parts by weight of one or more graft polymers of:
B.1 5 to 90 parts by weight and preferably 30 to 80 parts by weight of a mixture of
B.1.1 50 to 95 parts by weight styrene, α-methyl styrene, nucleus-substituted styrene, methyl methacrylate or mixtures thereof and
B.1.2 50 to 5 parts by weight acrylonitrile, methacrylonitrile, methyl methacrylate, maleic acid anhydride, N-substituted maleic imide or mixtures thereof, or
B.2 95 to 10 parts by weight and preferably 70 to 20 parts by weight of a rubber having a glass transition temperature $T_G$ of $\leq 10°$ C.,
C. 0 to 80 parts by weight of a thermoplastic copolymer of:
C.1 50 to 95 parts by weight styrene, α-methyl styrene, nucleus-substituted styrene, methyl methacrylate or mixtures thereof and
C.2 50 to 5 parts by weight acrylonitrile, methacrylonitrile, methyl methacrylate, maleic acid anhydride, N-substituted maleic imide or mixtures thereof, the sum of the parts by weight of A.+B.+C. being 100 parts by weight and
D. 0.5 to 10 parts by weight and preferably 1.0 to 5.0 parts by weight, based on 100 parts by weight of the mixture of A.+B.+C., of a hydroxyl-terminated aliphatic polycarbonate.

6 Claims, No Drawings

POLYCARBONATE MOULDING COMPOSITION WITH IMPROVED FLOW AND PROCESSIBLITY

This invention relates to thermoplastic molding compositions containing

A. 10 to 98 parts by weight and preferably 10 to 95 parts by weight of one or more thermoplastic aromatic polycarbonates,
B. 2 to 60 parts by weight and preferably 5 to 60 parts by weight of one or more graft polymers of:
B.1 5 to 90 parts by eight and preferably 30 to 80 parts by weight of a mixture of
B.1.1 50 to 95 parts by weight styrene, a-methyl styrene, nucleus-substituted styrene, methyl methacrylate or
B.1.2 50 to 5 parts by weight acrylonitrile, methacrylonitrile, methyl methacrylate, maleic acid anhydride, N-substituted maleic imide or mixtures thereof, on
B.2 95 to 10 parts by weight and preferably 70 to 20 parts by weight of a rubber having a glass transition temperature $T_G$ of $\leq 10°$ C.,
C. 0 to 80 parts by weight of a thermoplastic copolymer of:
C.1 50 to 95 parts by weight styrene, a-methyl styrene, nucleus-substituted styrene, methyl methacrylate or mixtures thereof and
C.2 50 to 5 parts by weight acrylonitrile, methacrylonitrile, methyl methacrylate, maleic acid anhydride, N-substituted maleic imide or mixtures thereof, the sum of the parts by weight of A.+B.+C. being 100 parts by weight, and
D. 0.5 to 10 parts by weight and preferably 1.0 to 5.0 parts by weight, based on 100 parts by weight of the mixture of A.+B.+C., of a hydroxyl-terminated aliphatic polycarbonate which
is synthesized primarily from diols corresponding to the following formulae $$HO-R-OH \qquad (1)$$

in which R=straight-chain or branched $C_1$-$C_{20}$ alkylene or optionally substituted $C_6$-$C_{20}$ cycloalkylene, and/or

in which n=1 to 4 and R''=H, $CH_3$ and/or $$HO-R'-S-R'-OH \qquad (3)$$

in which R'=$C_1$-$C_6$ alkylene and which has an average molecular weight ($\overline{M}_n$) of 400 to 10,000 and preferably 600 to 6000.

Thermoplastic molding compositions of polycarbonates, graft polymers and, optionally, copolymers have long been known, the problem of the joint line strength playing a major role (cf. DE-OS No. 2 259 565).

In addition, EP=A No. 0 080 767 describes mixtures of polycarbonates, copolymers and two different graft polymers which are said to have favorable flow properties in combination with good toughness, hardness and rigidity and which perform well in the falling ball test.

However, the flowability of these materials is not good enough for the production of large or complicated parts by injection molding, for example computer housing, motor vehicle components or structural panels. In cases such as these, the complete and rapid filling of the injection mold is still in need of improvement.

It has now been found that polycarbonate molding compositions showing better flow and better processibility toughness or joint line strength, can be obtained by addition of small quantities of the above-defined aliphatic polycarbonates D.

Thermoplastic aromatic polycarbonates A. suitable for the purposes of the invention are those of diphenols corresponding to the following formula (I)

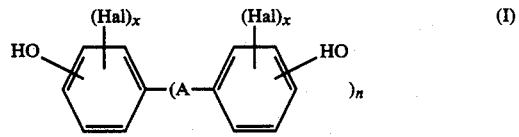

in which
A is a single bond, $C_1$-$C_5$ alkylene, $C_2$-$C_5$ alkylidene, a $C_5$-$C_6$ cycloalkylidene, —S— or —$SO_2$—; Hal is chlorine or bromine, x =0, 1 or 2 and n=1 or 0, and, optionally, to the following formula (Ia)

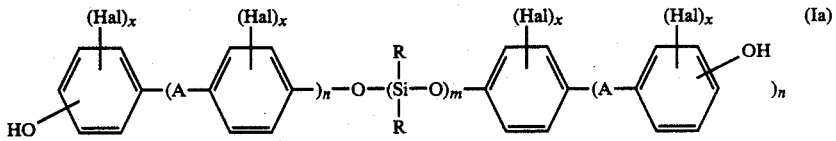

in which A, Hal, x and n are as defined for formula (I) and the substituents R may be the same or different and represent linear $C_1$-$C_{20}$ alkyl, branched $C_3$-$C_{20}$ alkyl, $C_6$-$C_{20}$ aryl, preferably $CH_3$, and m is an integer of 5 to 100 and preferably of 20 to 80.

Polycarbonates A. suitable for the purposes of the invention are homopolycarbonates and copolycarbonates, the diphenols corresponding to formula (Ia) only being used for the production of copolycarbonates with the diphenols of formula (I), for which purpose they are used in a quantity by weight of 1 to 20% by weight, preferably 1.5 to 15% by weight and more preferably 2 to 10% by weight, based on the total weight of the diphenols of formulae (I) and (Ia) used.

Polycarbonates A. suitable for the purposes of the invention are also mixtures of a copolycarbonate of the diphenols (Ia) and (I) and another siloxane-free thermoplastic polycarbonate, the content of the diphenols (Ia) in the polycarbonate mixture, based on the total sum of diphenols, being from 1 to 20% by weight.

The diphenols corresponding to formula (I) are known or may be obtained by known methods; polydiorganosiloxanes containing terminal hydroxyaryloxy groups corresponding to formula (Ia) are also known (cf. U.S. Pat. No. 3,419,634) or may be obtained by known methods.

The production of the polycarbonates A. suitable for the purposes of the invention is known and may be carried out, for example, with phosgene by the interfacial method or with phosgene by the homogeneous-phase method ("pyridine method"), the molecular weight being adjustable by a corresponding quantity of known chain terminators (for polydiorganosiloxane polycarbonates, see DE-OS No. 3 334 872).

Suitable chain terminators are, for example, phenol, p-chlorophenol, p-tert,-butylphenol, 2,4,6-tribromophenol, long-chain alkylphenols, such as 4-(1,3-tetramethylbutyl)-phenol (DE-OS No. 2 842 005), monoalkylphenols and dialkylphenols containing, in all, 8 to 20 carbon atoms in the alkyl substituents, such as 3,5-di-tert.-butylphenol, p-isooctylphenol, p-tert.-octylphenol, p-dodecylphenol and 2-(3,5-dimethylheptyl)-phenol and 4-3,5-dimethylheptyl)-phenol (DE-OS No. 3 506 472).

The polycarbonates A. suitable for the purposes of the invention have average weight-average molecular weights ($\overline{M}_w$, as measured by ultracentrifugation or scattered-light measurement)of 10,000 to 200,000 and preferably of 20,000 to 80,000.

Suitable diphenols corresponding to formula (I) are, for example, hydroquinone, resorcinol, 4,4'-dihydroxydiphenyl, 2,2-bis-(4-hydroxyphenyl)-propane, 2,4-bis-(4-hydroxyphenyl)-2-methylbutane, 1, 1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane and 2,2-bis-(3,5-dibromo-4-hydroxyphenyl)-propane.

Preferred diphenols corresponding to formula (I) are 2,2-bis-(4-hydroxyphenyl)-propane, 2,2-bis-(3,5-dichloro-4-hydroxyphenyl)-propane, 2,2-bis-(3,5-dibromo-4-hydroxyphenyl)propane and 1,1-bis-(4-hydroxyphenyl)-cyclohexane.

Particularly suitable diphenols corresponding to formula (Ia) are those in which R' is methyl, ethyl, propyl, n-butyl, tert.-butyl or phenyl, more especially those corresponding to the following formula (Ib):

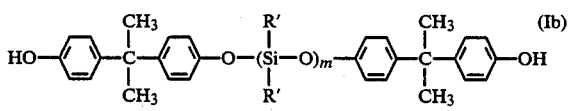

in which the substituents R' are the same and have the meaning defined above and m is an integer of 5 to 100 and preferably of 20 to 80.

The diphenols corresponding to formula (Ia) may be obtained, for example, from the corresponding bis-chlorine compounds corresponding to the following formula (II)

and the diphenols (I), for example in accordance with U.S. Pat. No. 3,419,635, column 3, in combination with U.S. Pat. No. 3,189,662.

In the bis-chlorine compounds (II), R and m have the same meaning as in the diphenols (Ia) and (Ib).

The polycarbonates A. suitable for the purposes of the invention may be branched in known manner, preferably through the incorporation of 0.05 to 2.0 mole %, based on the sum of the diphenols used, of trifunctional or more than trifunctional compounds, for example those containing three or more than three phenolic groups.

Besides bisphenol A homopolycarbonate, preferred polycarbonates are the copolycarbonates of bisphenol A with up to 15 mole %, based on the molar sum of diphenols, of 2,2-bis-(3,5-dibromo-4-hydroxyphenyl)-propane, and the copolycarbonates of the diphenols (I) with 1 to 20% by weight of the diphenols (Ia), preferably the diphenols (Ib), based in each case on the total weight of the diphenols (I) and (Ia) or (I) and (Ib).

Rubbers suitable for the production of the graft polymers B. are, in particular, polybutadiene, butadiene/styrene copolymers containing up to 30% by weight, based on rubber, of a lower alkyl ester of acrylic or methacrylic acid (for example methyl methacrylate, ethyl acrylate, methyl acrylate or ethyl methacrylate), polyisoprene, polychloroprene, alkyl acrylate rubbers based on $C_1$–$C_8$ alkyl acrylates, more especially ethyl, butyl, ethyl hexyl acrylate. The alkyl acrylate rubbers may optionally contain up to 30% by weight, based on rubber, of monomers such as vinyl acetate, acrylonitrile, styrene, methyl methacrylate and/or vinyl ether in copolymerized form. They may contain relatively small quantities, preferably up to 5% by weight, based on rubber, of crosslinking ethylenically unsaturated monomers in copolymerized form. Such crosslinking agents are, for example, alkylenediol di(meth) acrylates, polyester di(meth)acrylates, divinylbenzene, trivinylbenzene, triallyl cyanurate, allyl (meth)acrylate, butadiene and isoprene. Other suitable acrylate rubbers are products which contain a crosslinking diene rubber of one or more conjugated dienes, such as polybutadiene, or a copolymer of a conjugated diene with an ethylenically unsaturated monomer, such as styrene and/or acrylonitrile, as core and an acrylate rubber shell. Other suitable rubbers are, for example, EPDM rubbers, i.e. rubbers of ethylene, propylene and an unconjugated diene monomer.

Preferred rubbers for the production of the graft polymers B. are diene and alkyl acrylate rubbers.

The rubbers are present in the graft polymer B. in the form of at least partly crosslinked particles having an average diameter of 0.09 to 5 µm and preferably 0.1 to 1 µm. The graft polymers B. may be prepared by radical graft polymerization of the monomer mixtures B.1 defined at the beginning in the presence of the rubbers B.2 to be grafted. Preferred methods for the production of the graft polymers B. are emulsion, solution, mass or suspension polymerization. Particularly preferred graft polymers B. are ABS graft polymers. Halogen styrenes and p-methyl styrene are mentioned as examples of nucleus-substituted styrenes.

Preferred copolymers C. are those of at least one of the monomers styrene, a-methyl styrene, nucleus-substituted styrene according to C.1 with at least one of the monomers acrylonitrile, methacrylonitrile, methyl methacrylate, maleic acid anhydride, N-substituted maleic imide according to C.2.

Copolymers C. are often formed as secondary products in the graft polymerization for the production of component B., particularly when large quantities of monomer are grafted onto small quantities of rubber.

The quantity of 0 to 80 parts by weight, based on 100 parts by weight of the mixture of A.+B.+C., in which the copolymer C. is used in accordance with the invention does not include these secondary products of the graft polymerization.

The copolymers C. are resin-like, thermoplastic and rubber-free. Particularly preferred copolymers C. are those of styrene and/or a-methyl styrene with acrylonitrile and, optionally, methyl methacrylate.

Particularly preferred ratios by weight in the thermoplastic copolymer C. are 60 to 80% by weight C.1 and 40 to 20% by weight C.2.

The copolymers C. may be prepared by radical polymerization, more especially by emulsion, suspension, solution or mass polymerization. They preferably have molecular weights $\overline{M}_w$ (weight average, as determined by light scattering or sedimentation) of from 15000 to 200,000.

The hydroxyl-terminated polycarbonates D. may be prepared, for example, by reaction or diols, such as 1,3-propanediol, 1,4-butanediol and/or 1,6-hexanediol, diethylene glycol, triethylene glycol, tetraethylene glycol or thiodiglycol, with diaryl carbonates, for example diphenyl carbonates, or phosgene (DE-AS Nos. 1 694 080, 1 915 908 and 2 221 751; DE-OS No. 2 605 024).

They have an average molecular weight ($\overline{M}_n$) of 400 to 10,000 and preferably of 600 to 6000, as determined by terminal group analysis (reaction of the product with acetanhydride and back-titration of the unreacted acetanhydride, the residues of free carboxyl groups being determined by titration with KOH and deducted from the value obtained in the determination with acetanhydride).

The molding compositions according to the invention may contain other additives known for polycarbonates or graft polymers and copolymers, such as stabilizers, pigments, mold release agents, flameproofing agents and/or antistatic agents, in the usual quantities.

The molding compositions according to the invention, containing components A., B., C. and D. and, optionally, other additives, may be prepared by mixing their constituents in known manner and melt-compounding or melt-extruding the resulting mixtures at temperatures of 200° to 330° C. in standard mixing machines, such as internal kneaders, singlescrew or twinscrew extruders.

The present invention also relates to a process for the production of thermoplastic molding compositions containing the components A., B., C. and D. and, optionally, stabilizers, pigments, mold release agents, flameproofing agents and/or antistatic agents, characterized in that the components are mixed in known manner and the resulting mixtures are melt-compounded or melt-extruded in standard mixing machines at temperatures of from 200° to 330° C.

The components may be mixed in known manner either successively or simultaneously at a temperature of around 20° C. (room temperature) or even at a higher temperature.

The molding compositions according to the invention may be used for the production of moldings of any kind. More particularly, moldings may be produced by injection molding. Examples of moldings which may be produced from the molding compositions according to the invention include housing components of all kinds (for example for domestic appliances, such as juice presses, coffee machines, mixers) or cover panels for buildings and parts for motor vehicles. They may also be used in the field of electrical engineering by virtue of their favourable electrical properties.

Another form of processing is the production of moldings by deep drawing from prefabricated sheets or panels.

Particle sizes are always expressed as average-particle diameters $d_{50}$, as determined by ultracentrifuge measurements in accordance with W. Scholtan et al., Kolloid-Z. u. Z. Polymere 250 (1972), 782–796.

EXAMPLES

Polycondensates and polymers used

A. Linear polycarbonate based on bisphenol A having a relative solution viscosity $n_{rel}$ of 1.26 to 1.28, as measured in $CH_2Cl_2$ at 25° C. and in a concentration of 0.5 g/100 ml.

B.1 SAN-graft polymer of 50% by weight of a styrene/acrylonitrile mixture (ratio by weight 72:28) on 50% by weight of particulate polybutadiene having an average particle diameter ($d_{50}$) of 0.4 μm obtained by emulsion polymerization.

B.2 SAN graft polymer of 25% by weight of a styrene/acrylonitrile mixture (ratio by weight 72:28) on 75% by weight particulate polybutadiene having an average particle size ($d_{50}$) of 0.4 μm obtained by emulsion polymerization.

C. Styrene/acrylonitrile copolymer (ratio of styrene to acrylonitrile 72:28) having an intrinsic viscosity ($\eta$) of 0.55 dl/g (as measured in dimethylformamide at 20° C.).

D. Hydroxyl-terminated hexanediol polycarbonate having a molecular weight $\overline{M}_n$ of approximately 2000.

The components A., B., C. and D. were compounded at 200 to 220° C. in a 3-liter internal kneader.

Unless otherwise indicated, the moldings were produced at 260° C. in an injection molding machine.

The Izod notched impact strength was determined on bars measuring 2.5 x 1/2 x 1/8" in accordance with ASTM-D-256 at room temperature, at −20° C. and at −40° C.

The joint line strength was determined by the DuPont impact strength method in which a circular plate 50 mm in diameter and 3 mm thick was used as the test specimen. The circular plate had been cut from a 60 mm x 60 mm square plate 3 mm thick which had been produced by injection molding with two parallel sprues on one side.

A steel ball having a radius of 6.35 cm or 2.54 cm is placed on the center of the test plate. A steel weight then drops onto the ball. The maximum energy at which no break occurs at the joint line is determined.

Flowability is assessed from the filling pressure (see Johannaber, Kunststoffe 74 (1984, 1; pages 1–5) required to produce bars measuring $2.5 \times \frac{1}{2} \times \frac{1}{8}$" in the injection molding machine used (melt temperature 260° C.).

The composition of the materials tested and the data obtained are shown in the following Table:

|  | A. | B.1 | B.2 | C. | D. | Notched impact strength (J/m) | | | Joint line strength (kgcm) | Flowability (filling pressure) (bar) |
|---|---|---|---|---|---|---|---|---|---|---|
|  | (Parts by weight) | | | | | RT | −20° C. | −40° C. | | |
| Example according to the invention | 60 | 15 | 15 | 10 | 2 | 668 | 571 | 502 | 386 | 166 |
| Comparison Example | 60 | 15 | 15 | 10 |  | 688 | 576 | 535 | 370 | 195 |
| Example according to | 45 | 33 | — | 22 | 2 | 471 | — | — | — | 194 |

| | A. | B.1 | B.2 | C. | D. | Notched impact strength (J/m) | | | Joint line strength (kgcm) | Flowability (filling pressure) (bar) |
|---|---|---|---|---|---|---|---|---|---|---|
| | | | | | | RT | −20° C. | −40° C. | | |
| | (Parts by weight) | | | | | | | | | |
| the invention Comparison Example | 45 | 33 | — | 22 | — | 510 | — | — | — | 221 |

RT = room temperature +20° C.

The Table shows that molding compositions showing distinctly improved flowability are obtained through incorporation of the aliphatic polycarbonates D. (according to the invention). Other properties, more especially toughness and joint line strength, remain as good as before.

We claim:

1. Thermoplastic molding compositions containing
A. 10 to 98 parts by weight of one or more thermoplastic aromatic polycarbonates,
B. 2 to 60 parts by weight of one or more graft polymers of:
B.1 5 to 90 parts by weight of a mixture of
B.1.1 50 to 95 parts by weight styrene, α-methyl styrene, nucleus-substituted styrene, methyl methacrylate or mixtures thereof and
B.1.2 50 to 5 parts by weight acrylonitrile, methacrylonitrile, methyl methacrylate, maleic acid anhydride, N-substituted maleic imide or mixtures thereof, on
B.2 95 to 10 parts by weight of a rubber having a glass transition temperature $T_G$ of −10° C.,
C. 0 to 80 parts by weight of a thermoplastic copolymer of:
C.1 50 to 95 parts by weight styrene, α-methyl styrene, nucleus-substituted styrene, methyl methacrylate or mixtures thereof and
C.2 50 to 5 parts by weight acrylonitrile, methacrylonitrile, methyl methacrylate, maleic acid anhydride, N-substituted maleic imide or mixtures thereof, the sum of the parts by weight of A.+B.+C. being 100 parts by weight, and 0.5 to 10 parts by weight, based on 100 parts by weight of the mixture of A.+B.+C., of a hydroxyl-terminated aliphatic polycarbonate which is synthesized primarily from one or more diols selected from and corresponding to the following formulae $$HO-R-OH \qquad (1)$$

in which R=straight-chain or branched $C_1$–$C_{20}$ alkylene or $C_6$–$C_{20}$ cycloalkylene, $$HO-(CH_2-\overset{R''}{\underset{|}{C}H}-O)_nH \qquad 2.$$

in which n=1 to 4 and R″=H, $CH_3$ and $$HO-R'-S-R'-OH \qquad (3)$$

in which R′=$C_1$–$C_6$ alkylene and which has an average molecular weight ($M_n$) of 400 to 10,000.

2. Molding compositions as claimed in claim 1, containing 10 to 95 parts by weight of component A and 5 to 60 parts by weight of component B.

3. Molding compositions as claimed in claim 1, in which component B. consists of 30 to 80 parts by weight of B.1 and 70 to 20 parts by weight of B.2.

4. Molding compositions as claimed in claim 1 containing component D. in quantities of from 1.0 to 5 parts by weight, based on 100 parts by weight of the mixture A.+B.+C.

5. Molding compositions as claimed in claim 1, in which component A. is a polydiorganosiloxane polycarbonate block copolymer in which the proportion by weight of diphenol containing siloxane groups is 1 to 20% by weight, based on the diphenols as a whole.

6. Molding compositions as claimed in claim 1 containing stabilizers, pigments, mold release agents, flameproofing agents and/or antistatic agents.

* * * * *